March 12, 1968     H. A. CLARK     3,373,053
TRANSPARENT SHEET MATERIAL
Filed Sept. 3, 1964
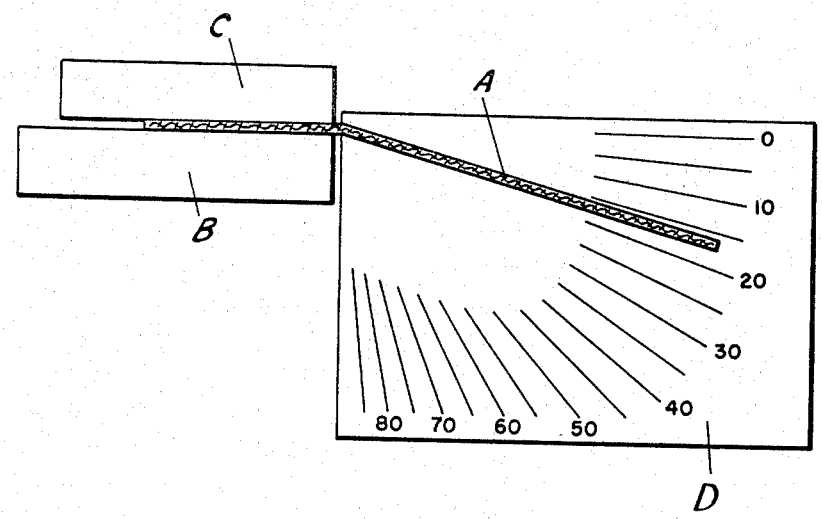
INVENTOR.
*HAROLD A. CLARK*
BY *Robert F. Fleming Jr.*

3,373,053
TRANSPARENT SHEET MATERIAL
Harold A. Clark, Midland, Mich., assignor to Dow
 Corning Corporation, Midland, Mich., a corporation of
 Michigan
Filed Sept. 3, 1964, Ser. No. 394,147
2 Claims. (Cl. 117—126)

ABSTRACT OF THE DISCLOSURE

A thermally stable siloxane transparent sheet material. When used in electrostatic printing equipment the sheet material retains suitable flexibility and exhibits nonstickiness during the heating process. When used in image projection instruments the sheet material displays appropriate clarity for transparencies.

An illustrative example being dipping twice with subsequent curing 116 type glass cloth into a 35% by weight xylene solution of copolymer resin having the following composition: 10 mol percent monomethylsiloxane, 33.5 mol percent dimethylsiloxane, 40 mol percent monophenylsiloxane, and 16.5 mol percent diphenylsiloxane.

---

This invention relates to a siloxane glass sheet material suitable for use as transparencies.

There has been a phenomenal growth in recent years in the use of office reproduction equipment. One of the most successful machines for this purpose involves electrostatic printing wherein the image is picked up on a selenium drum and transferred to a sheet material. It is fixed by employing a thermoplastic resin as the bonding agent for the ink pigment. In this process the sheet passes over a heating element where the temperature is sufficient to fuse the resin and permanently bond the ink to the sheet. The printed sheet then passes out of the machine by way of a series of rolls.

In order for a sheet material to be satisfactory for use in this type of machine, it is necessary that it have sufficient thermal stability that it does not become sticky during the heating process. It is also necessary that the sheet material have sufficient flexibility that it will maintain a flat position while on the carrier belt during the printing and fusing processes and will still be sufficiently rigid that it will bridge the gaps between the carrier rolls as it passes through the appartaus.

Paper and other opaque materials have the required characteristics to operate successfully in such a machine. However, it is often desirable to print images on a transparent material which can subsequently be used in projection apparatus to project the image on a screen. In this case the sheet material must be of sufficient clarity that light can pass through it without substantial distortion and the projected image must have sufficient contrast to be easily read.

The transparent thermoplastic organic materials which are often used for transparencies are completely unsuitable for use in the above machine. The primary problem being that they will not stand the heat required during the fusion of the ink. As a result, one of the most commercially successful apparatus presently being employed will not produce a type of printing material which is in wide demand.

The use of transparencies for the presentation of data at scientific and technical meetings and for other purposes has been steadily increasing. Therefore, there is a need for a suitable material for use in preparing such transparencies in office reproducing equipment employing heat to fuse the ink.

It is the object of this invention to provide an economical commercially feasible transparent sheet material for use in office reproducing equipment such as that sold under the name Xerox.

This invention relates to a transparent sheet suitable for use for the projection of images on a screen by passing light through said sheet consisting essentially of (1) square woven glass cloth, coated and impregnated with (2) a cured methylphenylpolysiloxane resin having the composition from 45 to 55% by weight phenyl groups based on the weight of the resin, a phenyl to silicon ratio of from .70 to .85, a phenyl to methyl ratio of from .90 to 1.15, and a total hydrocarbon to silicon ratio of from 1.45 to 1.55, any hydrocarbon groups in said resin other than phenyl, and methyl being essentially all ethyl groups in the form of monoethylsiloxane units in amount up to 15 mol percent of the total siloxane units in said resin, said transparent sheet being of such a degree of flexibility that it has a droop angle of at least 20° at 25° C. and not greater than 75° at 100° C.

The glass cloth used in the article of this invention is commercially available and should be of the square weave type. This means that there are essentially the same number of threads in one direction as in the other. This gives a glass having substantially the same optical properties in both the direction of the warp and the weft.

The amount of resin employed relative to the glass should be sufficient that it both coats and impregnates the glass cloth. That is, the resin should uniformly impregnate the pores in the cloth and should give a relatively smooth coating on both sides. This means that the thickness of the resin should be somewhat greater than the thickness of the glass cloth per se. The purpose of this is to give a smooth surface for the proper printing and for the proper optical properties of the sheet.

The precise thickness of the sheet, the relative proportions of resin and glass and the state of cure of the resin are not critical provided the finished sheet has the critical flexibility characteristics as defined by the droop angle. This angle is determined by the following test:

In order to better understand the test method reference is made to the drawing which is a schematic view of an apparatus suitable for measuring the droop. The coated fabric A is placed on level support B and flat weight C is placed thereon. This fabric is so placed on the support that four inches extend beyond the right angle edge of B. The sheet will sag as shown and the angle of droop is measured by sliding graduated scale D. In making this measurement the sheet is allowed to come to equilibrium, that is no more sag is detected for a period of one minute. Scale D is then moved until one of the marks of the scale is parallel with at least the last inch of the sheet. The angle is then read off the scale. In the illustration shown, the angle of droop is 15°. An average of four readings is taken for each sample at 25° C. and at 100° C. For the latter measurement the entire apparatus can be enclosed in a 100° oven.

With each specimen four readings are taken as follows: one end of the sheet is measured, the fabric is then turned over and the same end is again measured. Both sides of the other end of the specimen are then measured in the same way. Thus, one reading is taken for each end, for each side, and the average of these four is the droop angle.

The test specimens employed are strips of glass cloth 1¼ inches wide and at least 6 inches long, which were cut from the cured specimens in such a way that all edges were cut edges, thereby eliminating any possible reinforcement from the woven edges of the glass cloth. The specimens were prepared by double coating the glass cloth with the resin to give a total thicknes of from 6 to 9 mils, and then curing the coated resin according to the manufacturer's specifications or according to the procedure shown below.

It has been found that when the angle of droop is not at least 20° at 25° C., that the coated sheet is too stiff to operate satisfactorily in commercial machines. On the other hand, when the angle of droop is greater than 75° at 100° C. the coated sheet is too flexible to operate satisfactorily. A sheet that is too stiff cannot be suitably printed upon and may craze while passing through the various rolls. On the other hand, a sheet which is too flexible will not bridge the gaps between the rolls and hence will become tangled in the machine.

In order to obtain the desired characteristics above described, it is necessary that the organosiloxane resin have the composition defined above. The range of percent by weight phenyl groups, the phenyl to silicon ratio and the phenyl to methyl ratio regulate the refractive index of the resin so that it will sufficiently match that of the glass to give a sheet transparent enough to be operative in this invention. The ratio of total hydrocarbon groups to silicon atoms in part determines the flexibility of the coated sheet in that resins below the 1.45 ratio are too stiff, and those above the 1.55 ratio are too flexible. It should be understood that resins falling within this range may not have the desired degree of flexibility due to improper cure or due to other factors at present unknown. However, the desired characteristics are not obtained with the resins outside the above scope.

As stated above, the siloxane resins employed in this invention are phenyl and methyl siloxane resins in which the siloxane units can be, for example, monomethylsiloxane units, dimethylsiloxane units, phenylmethylsiloxane units, monophenylsiloxane units and diphenylsiloxane units. Optionally, the resins can contain up to 15 mol percent monoethylsiloxane units. When ethyl groups are present in the composition, the ratio of phenyl groups to total ethyl and methyl groups should fall within the range .90 to 1.15.

The siloxane resins can be applied to the glass cloth in any convenient manner. The most convenient one, however, being to dip the cloth into a solution of the catalyzed resin, thereafter pass the cloth through coating rolls and through a curing tower in order to obtain the proper cure. It is generally necessary to give at least two coatings to the cloth and the cloth should be coated on both sides.

The term "consisting essentially of" as employed herein means that the resin is essentially of the units defined, but may contain insignificant amounts of other silicon substituents which do not affect the basic characteristics of the sheet material.

The following examples are illustrative only and should not be construed as limiting the invention which is properly delineated in the appended claims.

Example 1

The copolymer siloxane resin employed in this example had the following composition: 10 mol percent monomethylsiloxane, 33.5 mol percent dimethylsiloxane, 40 mol percent monophenylsiloxane, and 16.5 mol percent diphenylsiloxane. The resin was prepared in the conventional manner by cohydrolyzing the corresponding chlorosilanes and then heating the resin as a 75% solution in toluene with .1% by weight zinc octoate until the 50% viscosity was 99 cps. The resin was then diluted with xylene to give a 35% by weight solution and 116 type heat cleaned glass cloth was double dipped into the solution. The first coat was cured 45 minutes at 230° F., the second coat was also cured 45 minutes at 230° F. and the temperature was then raised to 350° F. in 13 minutes and dropped to 250° F. in 3 minutes. The coated cloth was then removed from the oven and the final thickness was 7.5 mils. This cloth was found to have a droop angle of 24° at 25° C. and 70° at 100° C. (average of four measurements).

The sheet material was printed in a Xerox 914 Copier and produced excellent transparencies which projected satisfactorily when employed in a projection machine.

By contrast the following copolymer resin formulations were unsatisfactory.

TABLE

| Formulation | Droop Angle | |
|---|---|---|
| | 25° C. | 100° C. |
| 1—30 mol percent monomethylsiloxane<br>33 mol percent dimethylsiloxane<br>23 mol percent monophenylsiloxane<br>14 mol percent diphenylsiloxane | 78 | 83 |
| 40 mol percent monophenylsiloxane<br>28.6 mol percent dimethylsiloxane<br>20 mol percent monophenylsiloxane<br>21.4 mol percent diphenylsiloxane | 80 | 87 |
| 31.2 mol percent monomethylsiloxane<br>30 mol percent phenylmethylsiloxane<br>31.2 mol percent monophenylsiloxane<br>7.6 mol percent diphenylsiloxane | 12 | 30 |

That which is claimed is:
1. A transparent sheet suitable for use for the projection of images on a screen by passing light through said sheet consisting essentially of:
   (1) square woven glass cloth coated and impregnated with
   (2) a cured methylphenylpolysiloxane resin being of a thickness greater than the glass cloth to render both surfaces smooth and optically transparent having the composition consisting essentially of from 45 to 55% by weight phenyl groups based on the total weight of the resin,
   a phenyl to silicon mole ratio of from .70 to .85,
   a phenyl to alkyl mole ratio of from .90 to 1.15, and
   a total hydrocarbon to silicon mole ratio of from 1.45 to 1.55, any hydrocarbon groups in said resin other than phenyl and methyl being essentially all ethyl groups in the form of monoethylsiloxane units in amounts up to 15 mol percent of the total siloxane units in said resin, said transparent sheet being of such a degree of flexibility that it has a droop angle of at least 20° at 25° C. and not greater than 75° at 100° C.

2. The article of claim 1 in which the siloxane resin consists essentially of a copolymer of monomethylsiloxane, dimethylsiloxane, monophenylsiloxane and diphenylsiloxane.

References Cited

UNITED STATES PATENTS 2,706,190   4/1955   Clark _____ 117—126 X

ALFRED L. LEAVITT, *Primary Examiner.*

H. COHEN, *Assistant Examiner.*